(12) United States Patent
Moriya et al.

(10) Patent No.: US 6,727,891 B2
(45) Date of Patent: Apr. 27, 2004

(54) INPUT DEVICE FOR PERSONAL DIGITAL ASSISTANTS

(75) Inventors: Netzer Moriya, Ramat Hasharon (IL); David Gidron, Hod Hasharon (IL); Harel Primack, Rishon Le-Zion (IL)

(73) Assignee: Netmor, Ltd., Hod Hasharon (IL)

( * ) Notice: Subject to any disclaimer, the term of this patent is extended or adjusted under 35 U.S.C. 154(b) by 318 days.

(21) Appl. No.: 09/898,818

(22) Filed: Jul. 3, 2001

(65) Prior Publication Data

US 2003/0006975 A1 Jan. 9, 2003

(51) Int. Cl.[7] .................................................. G09G 5/00
(52) U.S. Cl. ........................ 345/169; 345/173; 345/179
(58) Field of Search ................................. 345/168, 169, 345/157, 158, 173, 179

(56) References Cited

U.S. PATENT DOCUMENTS

| | | | | |
|---|---|---|---|---|
| 4,613,866 A | * | 9/1986 | Blood | 342/448 |
| 5,293,529 A | * | 3/1994 | Yoshimura et al. | 345/158 |
| 5,587,558 A | * | 12/1996 | Matsushima | 178/18.01 |
| 5,635,826 A | | 6/1997 | Sugawara | 323/300 |
| 5,691,628 A | | 11/1997 | Martin | 323/237 |
| 5,747,972 A | | 5/1998 | Baretich et al. | 323/223 |
| 6,614,422 B1 | * | 9/2003 | Rafii et al. | 345/168 |
| 2002/0061217 A1 | * | 5/2002 | Hillman et al. | 400/489 |
| 2002/0075240 A1 | * | 6/2002 | Lieberman et al. | 345/170 |

FOREIGN PATENT DOCUMENTS

EP    0 865 150 A2    9/1998

\* cited by examiner

*Primary Examiner*—Regina Liang
(74) *Attorney, Agent, or Firm*—Fitch, Even Tabin & Flannery (57) ABSTRACT

A device, communicative with a PDA and comprising a movable part, that inputs to the PDA information about all or some of the six spatial variables of the movable part within a space that may be appreciably larger that the PDA and its display screen. The device may serve to conveniently input graphical and symbolic information, in place of a touch-screen, as well as to control multi-dimensional position and orientation of virtual objects in a natural analogous-motion manner. It may also be used in conjunction with an external passive keyboard to input alphanumeric information and commands.

21 Claims, 4 Drawing Sheets

INPUT DEVICE FOR PERSONAL DIGITAL ASSISTANTS

FIELD OF THE INVENTION

This invention relates to small digital informational devices, such as personal digital assistants (PDA) and cellular mobile telephones, and, in particular to means for inputting graphical and spatial information into such devices.

BACKGROUND OF THE INVENTION personal digital assistants (PDAs) are pocket-size computers, provided with various software packages to carry out a variety of tasks, such as managing calendars and personal data bases, financial data management and analysis, communications and game playing. The user usually communicates with the device by means of a so-called touch screen, which is spread over the display screen, to form a combined interactive screen. Beside data and graphics to be read by the user, there are displayed on the screen also various graphic user interface (GUI) devices, such as menus, dialog boxes and lists, with which the user interacts by touching the screen at the appropriate points—with the tip of his finger, with a pen or preferably with a passive stylus. In a like manner, there may be displayed on the screen an image of a keyboard (i.e. a virtual keyboard); when any key image is touched by the user, a corresponding code is generated, similar to that generated by a conventional keyboard. With appropriate software, the stylus may also be used to draw lines and to write symbols, such as cursive alphanumeric characters, by moving its tip over the screen.

This method of graphic input into a PDA has two major drawbacks: (a) A touch screen is a relatively expensive component (compared to a normal display screen). (b) The screen is necessarily small, thus requiring the user to limit the range of movement of the stylus and to control the movement very finely—which may prove undesirable for at least part of the user community. For virtual keyboard operation, the small size may prove particularly inconvenient, especially for multi-finger operation. In PDA devices that include a hardware keyboard, which generally is limited to twelve numeric keys (and is then called Keypad), such as cellular telephones, the above drawbacks are valid as well, whereby a keypad is even more limited in convenience.

For game playing and similar programs that involve spatial control of virtual objects on the screen, the usual manner of user interaction is by means of various control symbols and images on the screen, which the user touches with the same stylus. Such means of control are far from satisfactory, because they provide, at best, control along only two orthogonal axes at a time and because such control is not always analogous to the controlled entity of the virtual object; for example, a left-to-right motion of the stylus may control some angular orientation of the object or the rate of angular rotation. This, in many cases, proves to be inconvenient to the user and may lead to faulty operation.

There are various input devices known in the art and commonly used with conventional computers, such as a mouse, a so-called joy-stick and similar electromechanical devices, and various position input devices, also known as graphic tablets. Any of these may conceivably be connected to a PDA and thus used to effect the desired graphical input function and/or the desired control function, instead of the touch screen. All of them have, however, a major drawback in common, namely that their physical size is appreciable, compared with the size of a PDA, thus adding bulk to it and detracting from the usefulness of its pocket size. Also, each such device has additional drawbacks of its own. For example: A mouse does not provide any better control functions than as described above and is not handy for drawing lines and symbols; a graphic tablet is relatively expensive and is particularly bulky; and a joystick or its like serves best only for rate- and angular control but not for position control or for graphic input. Thus, to achieve most desired functions, at least two different ones of such devices need be deployed—which adds bulk and expense.

While a graphic tablet could conceivably be used for an external virtual keyboard, (thus avoiding the size limitations imposed by the display screen), no such applications have been known in the art (since so far no need has arisen). An additional drawback of the mouse and the graphic tablet, in common, is that they still provide only two-dimensional input at a time. Joy-stick like devices can provide control in more than two dimensions at a time, but their mode of operation is not analogous to the controlled variables (e.g. position, orientation and motion) of the virtual object, they usually control rate of motion (rather than position) and their movement is limited to a small volume around a fixed point. Various three-dimensional position input devices are known in the art, but all are even more expensive and bulky than the graphic tablet.

PDAs are already in ever widening use. Another type of a pocket-sized electronic device in widely increasing use is the cellular mobile telephone (CMT) with facilities for data communication and for personal data storage and management. There is a gradual increase in the number and sophistication of functions provided in CMT devices. Similarly to PDAs, CMTs also utilize a small screen to display data to the user. At present the prevailing means for input from the user is a keypad with twelve keys and several additional function buttons. It is expected, however, that, as the functionality of the CMTs widens, there will be a growing need for more graphics oriented and flexible input devices, similar to those needed for PDAs. It is even foreseen that the functions of a PDA and a CMT will eventually merge into a single device.

There is thus a need for, and it would be highly desirable to have, an input means for a PDA that will be compact and inexpensive and will enable convenient inputting of graphical and symbolic information. There is a further need for a compact and inexpensive means for inputting into a PDA three-dimensional graphics, and for controlling multi-dimensional position and orientation of virtual objects, displayed by a PDA, in a natural analogous-motion manner.

SUMMARY OF THE INVENTION

The present invention is applicable to PDAs, to function-enhanced CMTs, to any evolving combination of the two and to similar devices, including any that may evolve in the future. In the discussion to follow, as well as in the claims of the invention, all such devices will be referred to as PDAs, it being understood that the term PDA should be construed as applying to all and any of them.

Basically the invention provides a device, communicative with a PDA, that includes a hand-held movable part, or module, which inputs to the PDA information about all, or some of the six spatial variables of the movable part, namely its orientation about any of three orthogonal axes and the position of some reference point therein along any of three orthogonal axes. The movable part has preferably the form of a stylus, the size of an average pen, the reference point being near its tip, and will henceforth be referred to as a stylus. The device also includes a stationary part, or module, which is the one that communicates with the PDA; it may be an integral part of the PDA, mechanically attachable to it or a mechanically separate module. The device also includes a processing module, or processor, which receives electrical signals related to the spatial variables of the stylus and converts them into the desired coordinate- and orientation values, to be input to the PDA. As discussed in the Background section, the term PDA is used throughout this disclosure and application to represent any small digital device that provides display of data and graphics on a screen, such as a personal digital assistant or a cellular telephone with advanced data handling capabilities. The spatial variables, that is—position and/or orientation values in terms of two or three dimensions, fed into the PDA, are used to control various variables in programs running there. Examples of variables, which are frequently thus controlled, are analogous spatial coordinates of graphic elements and of simulated (virtual) objects. These and others are usually represented by graphic elements on the display screen of the PDA, so that the input spatial variables also control (albeit indirectly) position and orientation of graphics on the screen, thus forming an interactive loop with the operator of the device.

Any suitable technology may be utilized to embody the device, but the one described herein is preferred because of its good performance, the compactness that it enables and the low cost that it entails. This technology basically calls for low-frequency electromagnetic radiation, emitted from a plurality of sources disposed in the stationary module at some mutual distances and orientation, and one or more sensors for such radiation disposed in the stylus, one preferably being near the tip. The position and orientation values may be calculated from the strengths and relative phases of the signals resulting from sensing the radiation from the various sources. It is a feature of the technology, and hence—of the invention, that the distances between the sources may be small with respect to the region of space over which the stylus may be usefully moved. In the preferred embodiment, the radiation sources are electrical coils that generate magnetic fields and each sensor includes at least one device, in which each of the magnetic fields induces a corresponding signal. The spatial information is calculated in the processor, and supplied to the PDA, repeatedly. The processor also tracks any of the spatial variables, using estimation techniques.

In a first configuration of the invention, there is conveyed information about at least two spatial variables, namely position of the reference point along two axes. This information is useful in a wide variety of applications that may be programmed into the PDA, notably graphic applications, such as line drawing, object drawing and handwriting. To the extent that any program provides a drawing paradigm for more than two dimensions, information about corresponding variables of the stylus may be input and utilized therefor. Additionally the information may be used to move a cursor on the display screen and to effect various pointing, scrolling and selecting functions, as are commonly provided in graphical user interfaces—in the same manner as information from conventional input devices, such as a mouse, a touch pad and a joystick. Both absolute- and incremental modes of control may be exercised, the latter—with the help of a button-activated switch on the stylus.

In a second configuration of the invention, information about at least two position variables of the stylus tip, preferably all three position variables, is converted into codes corresponding to keys of a keyboard. In typical operation, there is provided some surface, external to the PDA (though it may conveniently be attached to it), on which is drawn the image of a keyboard. The user places the tip of the stylus within the marked image of any key, to effect generating the code of that key for inputting it to the PDA. In case of using only two-dimensional spatial information, the act of touching the surface is sensed by a suitable switch in the stylus. In the preferable case of three-dimensional spatial information, the act of touching may be detected by calculating the proximity of the tip to the surface and comparing it with some threshold. The three-dimensional mode also allows orienting the surface of the drawn keyboard at any angle with respect to the stationary module; a simple procedure, programmed into the processor and requiring the user to touch two or three marked points on the board, enables adapting the device to the board's orientation. A keyboard of any size (within the range of the device), with any layout and any symbology, may be drawn and used in the manner described. For any such keyboard a one-time calibration—or teaching procedure, programmed into the processor, is required.

In a modified form of the second configuration, there are a plurality of movable parts, which are preferably formed so as to be attachable to fingertips. These may operate, in conjunction with the single stationary part, to enable entering key positions on a keyboard by multiple fingers—akin to multi-finger typing.

In a third configuration of the invention, information about three-dimensional position of the tip of the stylus, as well as about orientation of the stylus about at least one axis is conveyed to the PDA in order to control, in a geometrically analogous manner, variables of any virtual object within a game program or a simulation program or the like. Both absolute- and incremental modes of control may be exercised, the latter—with the help of a button-activated switch on the stylus.

In another aspect of the invention, there is provided a method for typing, i.e. entering key symbol codes, into a PDA by touching key regions in a keyboard image on any surface external to the PDA, using the apparatus disclosed herein.

There is thus provided, according to the invention, an input device, communicative with a PDA, for inputting thereto the position of a movable reference point along at least two orthogonal axes, the PDA having a display screen, the device comprising:

a stationary module, communicative with the PDA and emitting electromagnetic radiation, and a movable module, in relation to which the reference point is defined and which is receptive to the radiation;

wherein the positions that may be input are at substantial distance from the display screen and their range, along each of the axes, substantially exceeds any dimension of the stationary module.

According to further features of the invention the stationary module includes at least two sources that emit the radiation, each source emitting the radiation at frequencies of less than 100 KHz.;

the movable module includes at least one sensor, operative to receive the radiation and to generate electrical signals in response to the reception of the radiation; and the device further comprises a processor, operative to process the electrical signals into position information.

According to other features of the invention, the processor is further operative to convert the position information into coordinates for positioning a cursor within the display on the screen of the PDA.

According to yet other features of the invention, there is defined a plane and within the plane there are defined key regions corresponding to keys of a keyboard and the processor is further operative to convert the position information into codes corresponding to the key regions. According to additional features, the processor is further operative to convert the position information also into a distance value along a direction normal to the marked external surface and to convert the distance value into a binary proximity indication, which signifies touching the surface.

In a common configuration of the invention the movable module is formed as a stylus; in an optional configuration there is a plurality of movable modules and they are formed as attachments to fingertips.

In an alternative configuration, according to the invention, there is provided an input device, cooperative with a PDA that includes a display screen, the device comprising a stationary module, communicative with the PDA, a movable module and a processor; wherein— the movable module has a reference point and is operative to generate electrical signals that are related to the position of the reference point and to the orientation of the movable module, and the processor is operative to process the electrical signals into at least four corresponding streams of values, to be fed into the PDA, each representing, respectively, any of the six variables associated with the movable module, namely the position of the reference point along three orthogonal axes and the orientation of the movable module about three orthogonal axes.

According to further features, the stationary module includes at least three sources that emit electromagnetic radiation, each source emitting the radiation at frequencies of less than 100 KHz.; and the movable module includes at least one sensor, operative to receive the radiation and to generate electrical signals in response to the reception of the radiation.

In another alternative configuration, there is provided a PDA comprising a display screen and an input device, for inputting into the PDA the position of a movable reference point along at least three orthogonal axes, the input device including:

a stationary module;

a movable module, in relation to which the reference point is defined and which is operative to generate electrical signals that are related to the position of the reference point; and a processor, operative to process the electrical signals into position information;

wherein the range of positions that may be input, along each of the axes, substantially exceeds any dimension of the stationary module.

In another aspect of the invention, there is provided a method for enabling a user of a PDA to key thereinto symbols of a keyboard by touching, or nearing, corresponding marked key regions on any surface external to the PDA, the method comprising:

(i) providing an input device that includes at least one movable part, each movable part having a reference point, the device being operative to generate is signals that represent the position of each of the reference points along at least two orthogonal axes;

(ii) for any key region within which any of the reference points is positioned, converting the resultant signals into a code signifying the corresponding key.

BRIEF DESCRIPTION OF THE DRAWINGS

In order to understand the invention and to see how it may be carried out in practice, a preferred embodiment will now be described, by way of non-limiting example only, with reference to the accompanying drawings, in which.

DETAILED DESCRIPTION OF THE PREFERRED EMBODIMENTS

Figure 1:
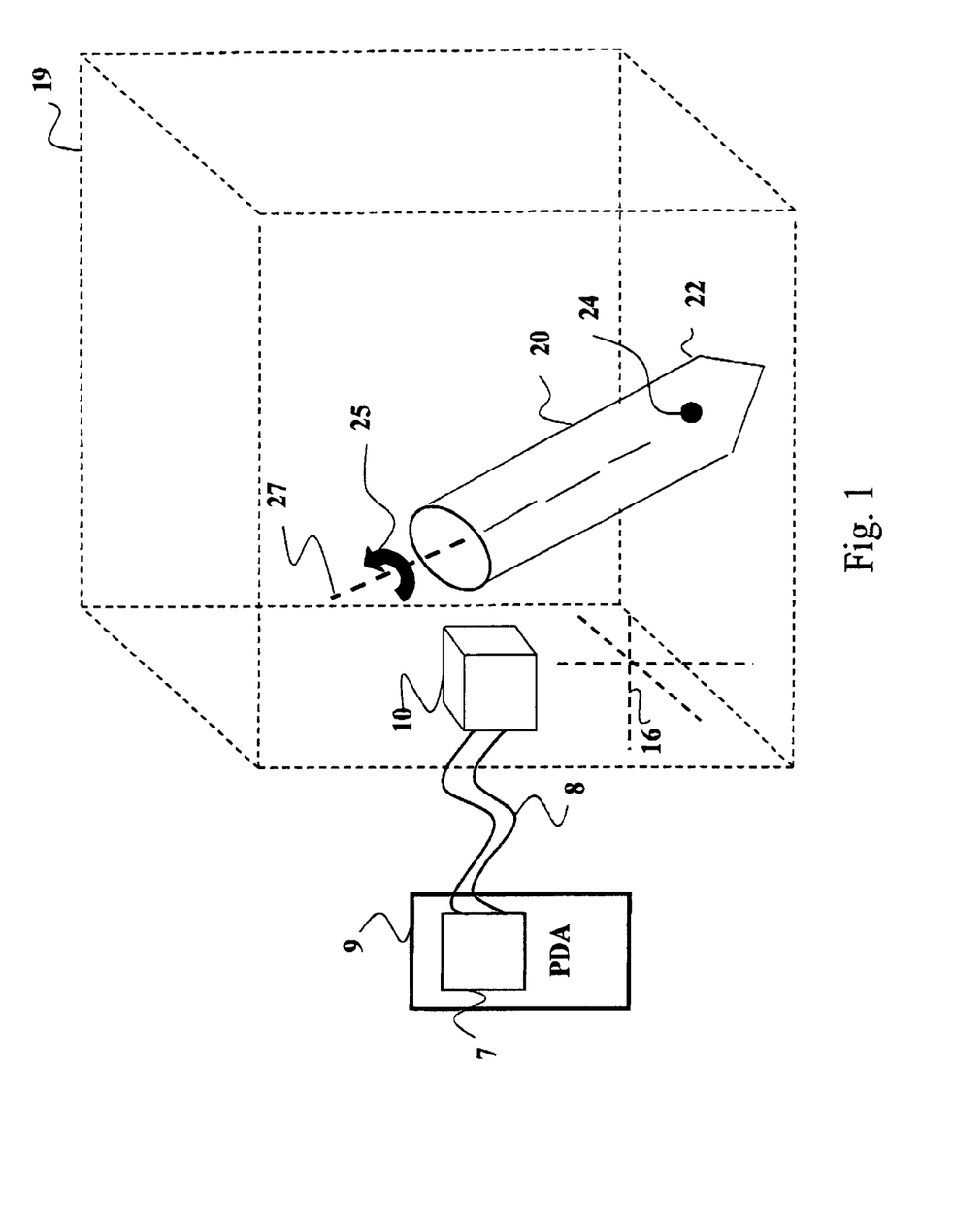
FIG. 1 is a schematic depiction of the device of a preferred embodiment of the present invention, in relation to a typical PDA.

In its preferred embodiment the device disclosed in this invention as represented in FIG. 1, includes a stationary module 10, a hand-held movable module 20, and a processor 30 (not shown in FIG. 1). Stationary module 10 may be an integral part of the PDA 9, mechanically attachable to it or a mechanically separate module. In the latter case, illustrated in FIG. 1, it is preferably connected to PDA 9 via a cable 8; alternatively, there may be a wireless communication link between them, using any method known in the art. It is noted that PDA 9 includes a display screen 7.

Movable module 20 has associated therewith an imaginary reference point 24 and an imaginary major axis 27. The module preferably has the form of a stylus, the size of an average pen, with a tip 22, as illustrated for example in FIG. 1. Movable module 20 will henceforth be referred to interchangeably as a stylus. The reference point 24 of stylus 20 is preferably, but not necessarily, near its tip 22. The major axis 27 is preferably the longitudinal axis of the stylus. The stylus may include some writing tool, such as a ball-point pen (not shown), its writing end forming tip 22 or protruding from it. Stylus 20 preferably also has a switch, activated when some pressure is applied to tip 22 along the length axis 27 of the stylus. If the writing tool is included, it is preferably spring-loaded and its axial movement activates the switch. Optionally, the stylus has one or more manual pushbutton activated switches. Stylus 20 communicates with stationary module 10; preferably this communication is via a wireless link, which may be of any type known in the art, but it may also be via a cable (not shown). Alternatively or additionally, stylus 20 may communicate directly with PDA 9, again—via any type of link. It should be understood that stylus 20, representing the movable module, may have any other shape than that depicted in the drawings or implied by the discussion herein.

There is implicitly defined in space a usable region 19, related to stationary module 10, over which the stylus may be usefully moved, i.e. over which its spatial variables may be detected and conveyed to the PDA. All points within region 19 are identifiable in terms of a coordinate system, preferably a cartesian coordinate system, such as coordinates 16, tied to stationary module 10. It is a feature of the invention that usable region 19 is external and not bound to display screen 7 of the PDA. It is a further feature of the invention that usable region 19 may be substantially larger, in any dimension, than stationary module 10, as well as screen 7. Also implicitly defined are two mutually orthogonal inclination angles of major axis 27 with respect to coordinate system 16, as well as a roll angle 25 of movable module 20 about its major axis 27.

Figure 3:
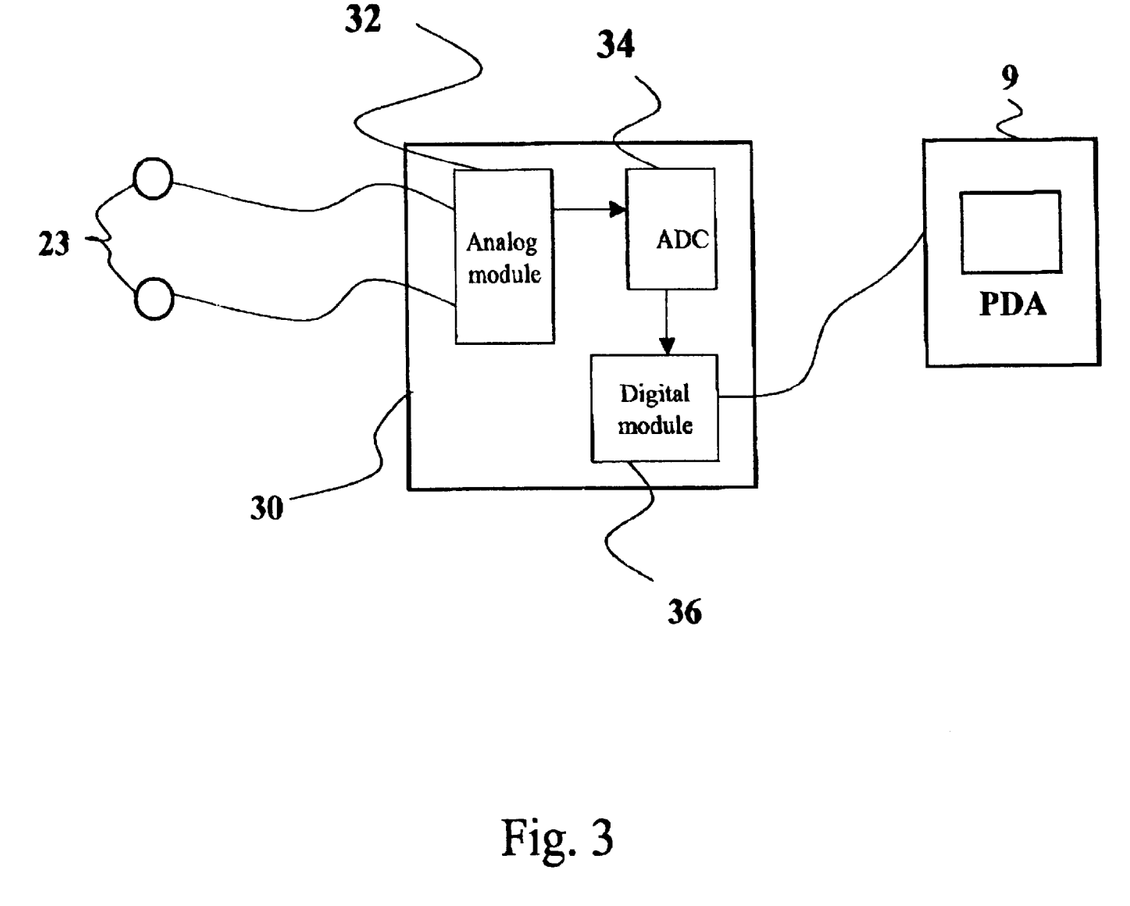
FIG. 3 is a schematic block diagram of the signal processing in the device of FIG. 1.

Processor 30 preferably includes analog- and digital circuitry, designed and programmed to carry out processing and calculating in order to continuously output to PDA 9 current spatial variables of movable module 20, in a manner described for example here below. All or part of the circuitry may reside in movable module 20 and/or in stationary module 10, and/or in PDA 9, but preferably the analog circuitry resides in the movable module. In some configurations of the invention, logical modules of processor 30 form distinct physical component-processors, whereby, for example, one or more component-processors include only analog circuitry (and a digital-to-analog converter), while other component-processors include only digital circuitry. In some optional configurations of the invention, some or all of the digital calculation functions may be carried by any digital processor within the PDA, appropriately programmed; in these configurations such a program constitutes, in effect, part of Processor 30. In the preferred embodiment, as shown in FIG. 3, Processor 30 includes three portions—an analog portion 32, an analog-to-digital (A/D) converter 34 and a digital portion 36. Preferably the first two portions are housed within movable module 20, while digital portion 36 is housed within stationary module 10 (FIG. 1).

Figure 2:
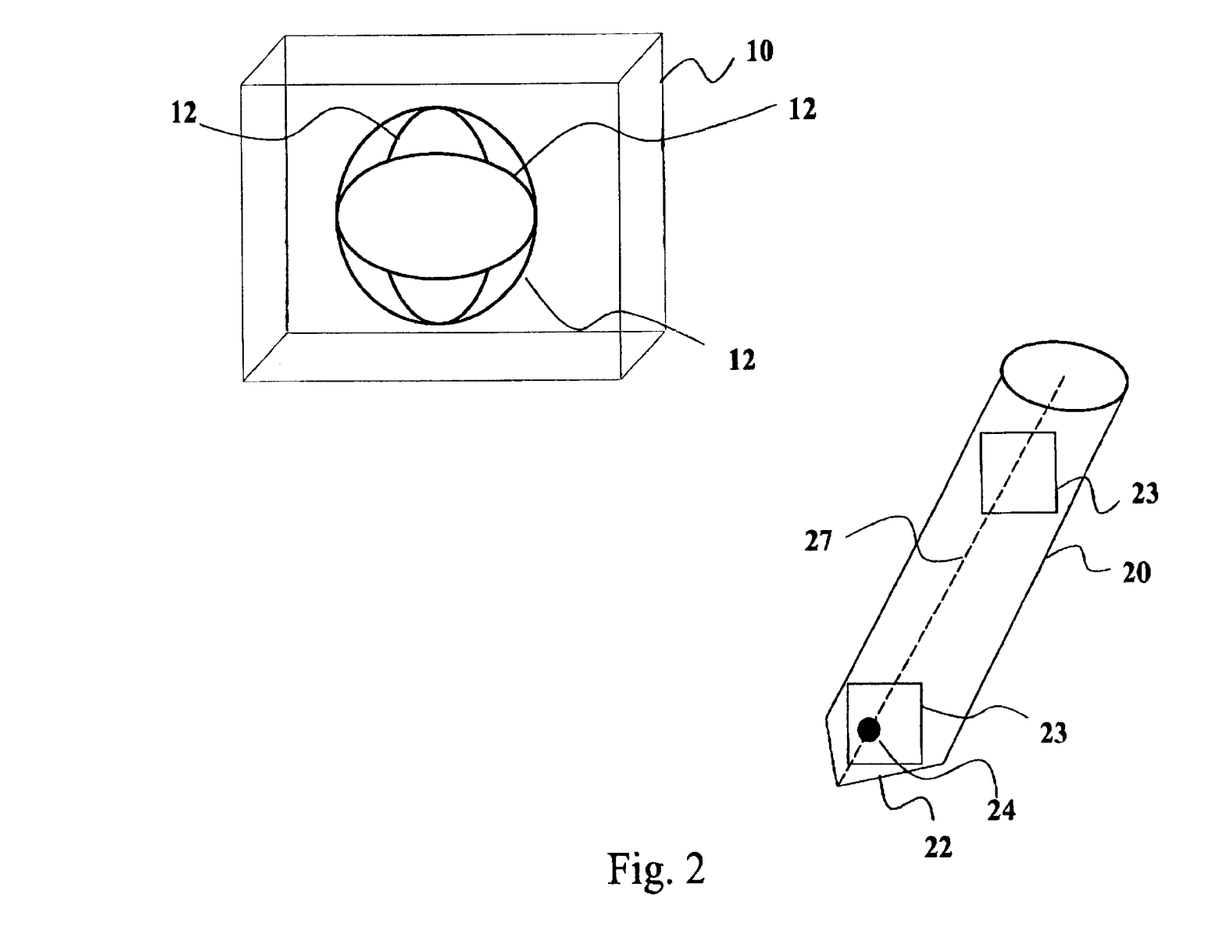
FIG. 2 is a schematic drawing of the main components of the device of FIG. 1.

Any suitable technology may be utilized to embody the stationary and movable modules, but the one disclosed in U.S. patent application Ser. Nos. 09/345,189 (Jun. 30, 1999) and 09/384,314 (Aug. 27, 1999) and briefly described in what follows, with reference to FIG. 2, is preferred because of the compactness that it enables, the low cost that it entails and its relative immunity to interference and to field distortions by surrounding objects. Basically there are a plurality of sources 12 disposed in stationary module 10, at some mutual distances, which emit low-frequency electromagnetic radiation, each source—at a characteristic frequency. Preferably the distances between the sources are small with respect to the size of usable region 19. In movable module 20 there is one or more sensors 23, receptive to such radiation. Each sensor 23 outputs an electrical signal that is proportional to the strength of each radiation signal that it receives. A sensor 23 is so constructed that the reception strength of any radiation signal depends on the direction of its source with respect to some reference axis of the sensor. The reception strength also depends on the distance between the source and the sensor. In addition, the phase of the radiation received at each sensor indicates field distortions caused by interfering conductive objects and can be used to compensate for such distortions in the subsequent calculation of distances and orientation, thus improving the performance of the device.

Preferably at least one sensor 23 is disposed close to reference point 24 (i.e. near tip 22 in the stylus form) and so that its reference axis is parallel to length axis 27.

Referring now to FIG. 3, Processor 30, according to the preferred embodiment, receives the electrical signals from all sensors 23, corresponding to received radiation from all sources 12, and first processes them linearly, within its analog portion 32, then converts them from analog to digital representation—for example by means of A-to-D converter 34, and finally proceeds to process them digitally in its digital portion 36. Processor 30, and in particular its digital portion 36, is designed and programmed to calculate, from the amplitudes, and preferably also the phases, of the various signals, position and orientation values of, respectively, reference point 24 and of the stylus (e.g. inclination angles of its major axis 27 and roll angle 25 about this axis). The calculation is carried out repeatedly—typically at 100 times per second, producing streams of values, each corresponding to one of the six spatial variables—three position coordinates and three orientation angles. In any particular configuration, or operating mode, of the device all or only certain ones of the spatial variables are conveyed and the corresponding streams of values—calculated. These streams of values are communicated to the PDA, using any communication protocol known in the art.

The calculation is based on the known relation between the strength and phase of any received signal, on the one hand, and the distance and direction of any source from the respective sensor, on the other hand. It preferably consists mainly of three stages: In the first stage the amplitude- and phase values of signals received by each sensor 23 from the various sources 12 are detected (preferably by synchronous frequency discrimination, as disclosed for example by the applicant in U.S. patent application Ser. No. 09/384,314, or by any other means known in the art). In the second stage a set of simultaneous equations is, in effect, solved for the various distances and directions. This is preferably done by numerical methods—for example, by successive approximation. A particularly useful and efficient technique, used in the preferred embodiment to more quickly converge on correct values in spite of noise and sensing inaccuracies, is based on path estimation, whereby predefined data history is incorporated, using Kalman Filtering. By this technique (which has been disclosed by the applicant—for example in U.S. patent application Ser. No. 09/575,517), the processor tracks any of the spatial variables, calculating estimated values of position and orientation and trying them in the equations. In the third stage geometric transformation, based on the known positions of the sources and on some distance calibration values (obtained during a brief calibration procedure, to be explained below), convert the values resulting from the second stage into position coordinates of reference point 24 and orientation angles of reference axes 25.

Preferably, the device is based on the principles disclosed by the applicant—for example in the aforementioned U.S. patent application Ser. No. 09/345,189. Accordingly, the radiation sources are electrical coils, through which alternating currents are made to flow, thus generating corresponding electromagnetic fields, which extend into the usable region. It is noted that, owing to the relatively low frequency of the radiation and the relative proximity of the sensors, the fields behave in effect as purely magnetic fields and will therefore also be referred to as such. Also according to these principles, each sensor consists preferably of a small coil, in which each magnetic field, from a respective source, induces a corresponding electromotive force (emf). It is noted that the sensor may also be of any other type that responds to magnetic fields, such as a Hall-effect transducer. The magnetic field strength preferably varies sinusoidally, at a frequency of typically 10 KHz, each source preferably having one characteristic frequency. It is noted that other forms of source characterization known in the art, such as pulse time division or pulse code division, may be employed—all coming within the scope of the invention. The combined emf's induced in each coil are amplified (in analog portion 32 of Processor 30—see FIG. 3); then (after conversion in A/D converter 34) they are, during the first stage of digital processing (in digital portion 36), separated into individual components, each corresponding to a particular source, using, for example, frequency discrimination methods, and their respective amplitudes and, possibly, phases—detected.

When serving for two-dimensional graphics input, or for pointing and/or scrolling, the device of the invention is used, in conjunction with a movable cursor in the PDA's display and optionally with the aid of an external hard surface, similarly to conventional devices—in either absolute or incremental mode of operation. In an absolute mode, the cursor is made to follow and represent the position of the tip of the stylus, possibly on the hard surface, within the usable region. Pressing the tip of the stylus or a pushbutton thereon is interpreted, for example, as a selection action; continuous pressure, while moving the stylus, may, for example, be interpreted as a tracing or drawing action. Such drawing action may be applied in various operational mode, including in particular hand-writing characters (numerals and possibly letters). Such hand-written characters may be decoded by a suitable software program in the PDA, such as are known in the art. In an incremental mode, the cursor is made to follow the tip of the stylus only while, for example, it is pressed against the hard surface (in a similar manner to the operation of a conventional mouse). The absolute mode is particularly useful for tracing points or lines in a drawing actually placed on the hard surface. It is noted that all motions and displacements of the stylus may be scaled down so that resultant cursor movements or drawn lines fit with the display area of the PDA. The relation between the position of the stylus and the display in the absolute mode can be determined during a brief preliminary calibration procedure, whereby the stylus is placed at a number of points, preferably two, at certain extremes of the usable region in correspondence with respective points displayed on the PDA's screen.

When serving for three-dimensional graphics input, the stylus is moved freely in three-dimensional space within the usable region. Depending on the controlled application program, a cursor is moved or a line is drawn in the plane of the PDA display, with the third dimension optionally indicated by some other display parameter. Operation in incremental mode and indication of drawing action is effected by means of any of the pushbutton switches on the stylus. Again, any scale may be assigned along each of the three position axes in converting motion of the stylus to resultant effects on the screen.

For the purpose of handwriting identification and, particularly, signature authentication, the invented device may advantageously be operated with the two orientation angles of stylus 20 (FIG. 1) with respect to the fixed coordinate system 16 sensed, in addition to position values of the reference point along two, or preferably three, coordinate axes. The values would be fed to the PDA, where a suitable software program (not part of the present invention) would perform the classification process, whereby the extra degrees of freedom thus provided may contribute to richer characterization of handwriting and signatures and therefore—to more reliable identification. Multiple degrees of freedom may similarly serve advantageously in any current or future program (not part of the present invention) for decoding handwritten characters.

Figure 4:
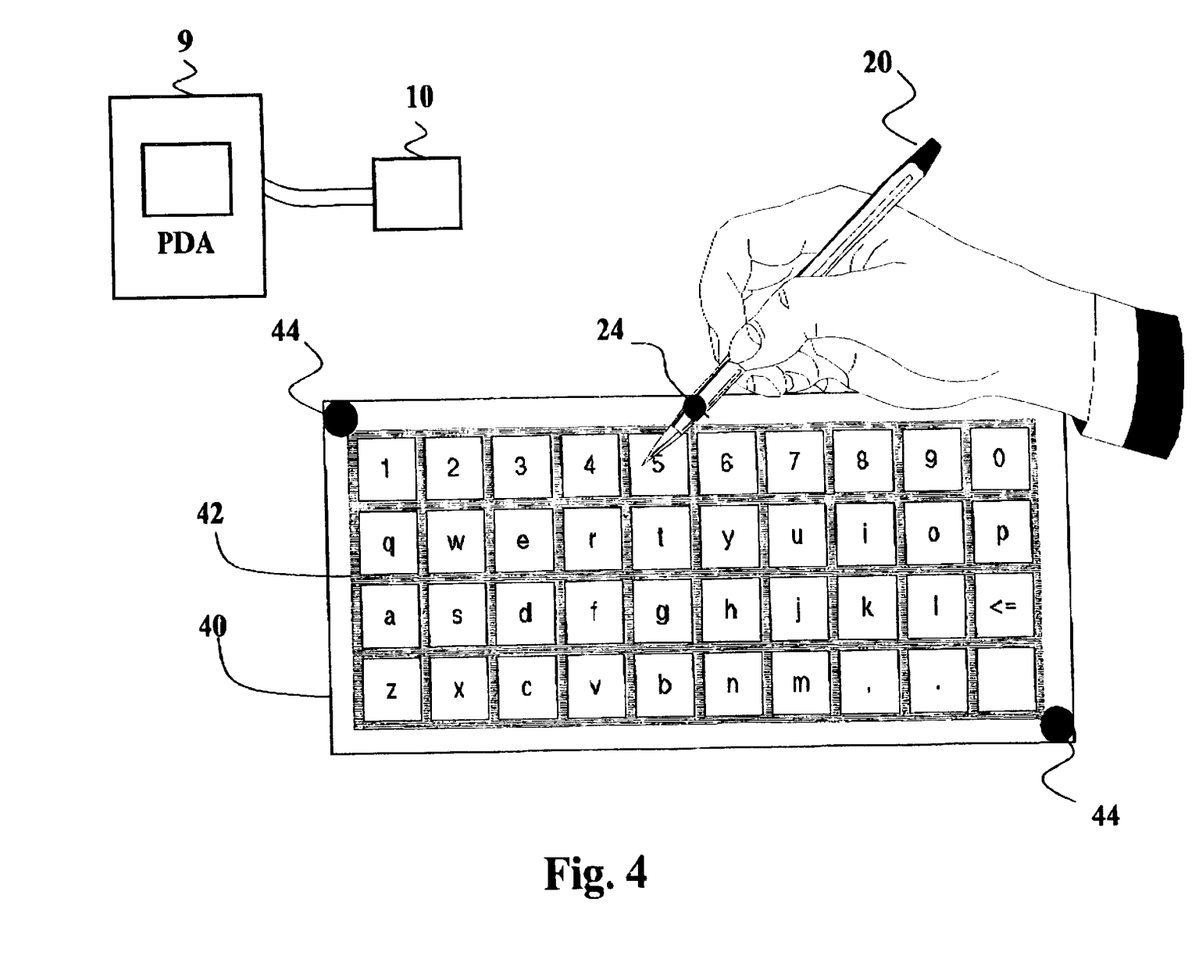
FIG. 4 is schematic drawing illustrating the use of a device according to the invention as a virtual keyboard.

For operating the invented device as a virtual keyboard, as illustrated in FIG. 4, the user would typically provide the image of a keyboard 42 on the surface of some physical board or panel 40. Alternatively, panel 40, possibly as a flexible sheet, may be provided as an attachment to, or foldable part of, the PDA 9; however it does not necessarily have any electrical or other communicative connection thereto. Typically, movable module 20 will be formed as a stylus, with reference point 24 near its tip. On keyboard panel 40 are preferably also drawn or indicated two or more reference- or positioning marks 44; their number is preferably two, if only two dimensions are sensed, and three—if three dimensions are sensed. The board 40 is placed at some fixed position with respect to the stationary module 10 (which, as discussed above, may be housed within, or attached to, PDA 9) and this position is indicated to Processor 30 (FIG. 3) during an initial positioning procedure, by touching the tip of stylus 20 to each positioning mark 44 on the board. If the drawn image of the keyboard is not standard or not previously used, its layout may have to be indicated to the processor during a one-time teaching procedure, whereby the identity of each key is displayed on the PDA and the user is asked in response to touch the center of the corresponding key image with the tip of the stylus. During subsequent, normal operation, the user places the tip of stylus 20 within the marked region of any desired key on the keyboard image 42 and the corresponding code is sent to the PDA.

This operation is enabled by appropriate programming of Processor 30 and providing therein a lookup table that converts position values corresponding to key regions on the panel into corresponding symbol codes. When the input device is configured to input only two position values (i.e. two-dimensional information), operation as a virtual keyboard requires signal from the tip actuated switch to indicate the act of touching (i.e. typing the key). When the input device is configured to input all three position values (i.e. three-dimensional information), there is a wide latitude in the orientation of the keyboard 42 with respect to stationary module 10. The processor is then programmed to first compute the position of the reference point in terms of the fixed space coordinates 16 (FIG. 1), as before, then transform position values into two orthogonal coordinates in the plane of the board and one coordinate normal to the board. The coordinates within the plane of the board are then converted into key codes, as explained above. The normal coordinate value, which is that of the distance of reference point 22 from the board, is compared with a threshold value that represents certain proximity to the board; whenever it becomes less than the threshold, a touch action is indicated. This takes the place of a tip-activated switch.

Another form of movable module 20, particularly useful for keying operation such as described above, is a thimble or a small ring or similar a object that can be placed on, or attached to, a fingertip. In fact, a plurality of such thimble-like movable modules 20, all receiving radiation from a single stationary module 10, may be provided, to be placed on various fingers and to thus enable multi-finger typing. Signals received by processor 30 from the movable modules would then be encoded into corresponding key designations in the order received (corresponding to the order of touching the virtual keys). It is noted that a three-dimensional input system is particularly advantageous for such multi-finger operation, because it obviates the need for providing each movable module (e.g. thimble) with a touch-sensing switch. Multiple thimble-like movable modules are preferably tied together by flexible means, to form a glove-like device. For multi-finger operation, the keyboard panel may additionally be provided with tactile clues, such as protrusions, to enable so-called touch typing; this imbues it with an additional advantage over a virtual keyboard displayed on the PDA.

It should be understood that the keying methods described above are applicable, not only to an alphanumeric keyboard, but to any set of symbols or command representations that are provided in a geometric layout, including a three-dimensional layout. Therefore, the term keyboard herein should be construed as including any such sets and layouts.

For controlling a virtual object in a game- or simulation program in the PDA, the device of the invention is best used so that the position and orientation of the movable module within the usable region simulate the desired values of the corresponding spatial variables of the object and are, therefore, analogous to them. Depending on the definition of the space variables in the particular game- or simulation program in the PDA, values generated by the Processor, in response to user-determined position and orientation of the movable module, may be converted accordingly—for example, into coordinates and orientation angles within the display plane of the PDA and additional coordinates. Any configuration of the input device as to the number of dimensions calculated and conveyed to the PDA, from two- to six dimensions, is usable; however, the device has particular advantages when the number of dimensions is three or more and is especially advantageous with four or more dimensions, whereby at least one orientation variable is included.

Many other embodiments and configurations of the devices and methods described are possible—all coming within the scope of the invention, which is defined by the claims that follow. In the method claims, roman numerals and alphabetic characters used to designate claim steps are provided for convenience only and do not imply any particular order of performing the steps.

What is claimed is:

1. An input device, for enabling a user of a PDA to key thereinto symbols of a keyboard by touching, or nearing, corresponding marked key regions on any surface external to the PDA, the device comprising:
    a stationary part, communicative with the PDA and emitting electromagnetic radiation;
    at least one movable part, each having a reference point and being operative to receive said radiation and to generate electrical signals in response to the reception of said radiation; and
    a processor, operative to process said electrical signals into any code that corresponds to a symbol of the keyboard whenever the reference point of any of said movable parts is near, or within, a respective key region.

2. The device of claim 1 wherein said processor is operative to process said electrical signals in three stages—first processing said electrical signals into position values along at least two orthogonal axes relative to said stationary module, secondly converting said position values into coordinate values in the plane of the marked external surface and thirdly converting said coordinate values into said code.

3. The device of claim 2 wherein said at least two orthogonal axes is at least three orthogonal axes and said conversions can be carried out for any orientation of the marked external surface with respect to said stationary module.

4. The device of claim 3 wherein said processor is further operative—
    during the second stage of processing, to convert said position values also into a distance value along a direction normal to the marked external surface and
    during the third stage of processing, to convert said distance value into a binary proximity indication, which signifies touching the surface.

5. The device of claim 1 wherein one of said movable parts is formed as a stylus and the respective reference point is near the tip of the stylus.

6. The device of claim 1 wherein any of said movable parts is formed as an attachment to a finger.

7. A PDA comprising a display screen and an input device, for enabling a user of the PDA to key thereinto symbols of a keyboard by touching, or nearly touching, corresponding marked key regions on any surface, the input device including:
    a stationary part, communicative with the PDA and emitting electromagnetic radiation;
    at least one movable part, each having a reference point and being operative to receive said radiation and to generate electrical signals in response to the reception of said radiation; and
    a processor, operative to process said electrical signals into any code that corresponds to a symbol of the keyboard whenever the reference point of any of said movable parts is near, or within, a respective key region.

8. The PDA of claim 7 wherein said processor is operative to process said electrical signals in three stages—first processing said electrical signals into position values along at least two orthogonal axes relative to said stationary module, secondly converting said position values into coordinate values in the plane of the marked external surface and thirdly converting said coordinate values into said code.

9. The PDA of claim 8 wherein said at least two orthogonal axes is at least three orthogonal axes and said conversions can be carried out for any orientation of the marked external surface with respect to said stationary module.

10. The PDA of claim 9 wherein said processor is further operative—
    during the second stage of processing, to convert said position values also into a distance value along a direction normal to the marked external surface and
    during the third stage of processing, to convert said distance value into a binary proximity indication, which signifies touching the surface.

11. The PDA of claim 7 wherein one of said movable parts is formed as a stylus and the respective reference point is near the tip of the stylus.

12. The PDA of claim 7 wherein any of said movable parts is formed as an attachment to a finger.

13. The PDA of claim 7 further comprising a sheet or a panel, which is unfoldable or attachable, not in close proximity to said display screen, and has key regions marked thereon and wherein said input device is cooperative with said sheet or panel to enable a user of the PDA to key thereinto symbols of a keyboard corresponding to said key regions.

14. A method for enabling a user of a PDA to key thereinto symbols of a keyboard by touching, or nearing, corresponding marked key regions on any surface external to the PDA, the method comprising:
    (i) providing an input device that includes at least one movable part, each movable part having a reference point, the device being operative to generate digital values that represent the position of each of said reference points along at least two orthogonal axes;
    (ii) for any key region within which any of said reference points is positioned, converting the resultant digital values into a code signifying the corresponding key;
    (iii) feeding the code obtained in step (ii) into the PDA;
    (iv) feeding the code obtained in step (iii) into any program operative within the PDA.

15. The method of claim 14 wherein—
said input device further includes a stationary part that emits radiation from a plurality of regions thereon,
each of said movable parts is operative to receive said radiation from all of said regions and to generate reception signals accordingly and said input device is operative to generate said digital values by processing said reception signals.

16. The method of claim 15 wherein the external surface, on which key regions are marked, is separate from the PDA, the method further comprising:
   (iii) providing at least two positioning marks on the external surface;
   (iv) running a surface positioning procedure, whereby any of said reference points is placed at each of said marks and the corresponding resultant digital values are noted.

17. The method of claim 15 wherein one of said movable part is formed as a stylus, said reference point being at or near the tip of said stylus.

18. The method of claim 15 wherein any of said movable parts is formed as an attachment to a finger.

19. The method of claim 18 wherein said input device is operative to generate digital values that represent at least the position of each of said reference points along three orthogonal axes and wherein step (ii) includes
   (a) converting said digital values into keyboard values, which are values along coordinates within the marked external surface and into proximity values, which are values along a coordinate normal to that surface; and
   (b) converting said keyboard values into a code signifying the key; and further comprising:
   (v) converting said proximity values into an indication of the proximity of the respective reference point from the surface.

20. The method of claim 14, wherein steps (i) and (ii) are carried out within said input device.

21. The method of claim 14, wherein steps (iii) and (iv) are carried out within the PDA.

* * * * *